United States Patent
Kennewick, Sr.

(10) Patent No.: US 9,535,962 B2
(45) Date of Patent: Jan. 3, 2017

(54) IN-VIEW AND OUT-OF-VIEW REQUEST-RELATED RESULT REGIONS FOR RESPECTIVE RESULT CATEGORIES

(71) Applicant: VOICEBOX TECHNOLOGIES CORPORATION, Bellevue, WA (US)

(72) Inventor: Michael R. Kennewick, Sr., Bellevue, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/855,331

(22) Filed: Sep. 15, 2015

(65) Prior Publication Data

US 2016/0078106 A1    Mar. 17, 2016

Related U.S. Application Data

(60) Provisional application No. 62/051,252, filed on Sep. 16, 2014.

(51) Int. Cl.
  *G06F 17/30* (2006.01)
(52) U.S. Cl.
  CPC ... *G06F 17/30554* (2013.01); *G06F 17/30401* (2013.01); *G06F 17/30598* (2013.01)
(58) Field of Classification Search
  None
  See application file for complete search history.

(56) References Cited

U.S. PATENT DOCUMENTS

| | | | |
|---|---|---|---|
| 5,590,039 A | 12/1996 | Ikeda | |
| 7,702,636 B1 * | 4/2010 | Sholtis | G06F 17/30566 707/999.1 |
| 2006/0235816 A1 | 10/2006 | Yang | |
| 2007/0239671 A1 | 10/2007 | Whitman | |
| 2008/0154859 A1 * | 6/2008 | Chi | G06F 17/30867 |
| 2008/0172374 A1 | 7/2008 | Wolosin | |
| 2009/0171891 A1 | 7/2009 | Nochimowski | |
| 2011/0167350 A1 | 7/2011 | Hoellwarth | |
| 2011/0173569 A1 * | 7/2011 | Howes | G06F 17/30902 715/835 |
| 2011/0252016 A1 | 10/2011 | Shacham | |

(Continued)

FOREIGN PATENT DOCUMENTS

WO    2016044286    3/2016

*Primary Examiner* — Miranda Huang
(74) *Attorney, Agent, or Firm* — Sheppard Mullin Richter & Hampton LLP (57) ABSTRACT

The invention relates to systems and methods of providing in-view and out-of-view request-related result regions for respective result categories. The system may facilitate result presentation by providing, in response to a user request, at least one region that is designated to initially be in-view and at least one region that is designated to initially be out-of-view where: (i) the initial in-view region comprises one or more results related to the user request and a first category; and (ii) the initial out-of-view region comprises one or more results related to the user request and the second category. A result related to a category may comprise a result related to a specific topic, a result of a specific type, a result from a specific source, or other result. A user request may comprise a query, a command, or other user request.

28 Claims, 8 Drawing Sheets

(56) References Cited

U.S. PATENT DOCUMENTS

2012/0147037 A1\* 6/2012 Takami ............ G06F 17/30991
              345/629
2013/0232148 A1  9/2013 MacDonald
2014/0258838 A1\* 9/2014 Evers ................ G06F 17/243
              715/234

\* cited by examiner

IN-VIEW AND OUT-OF-VIEW REQUEST-RELATED RESULT REGIONS FOR RESPECTIVE RESULT CATEGORIES

CROSS REFERENCE TO RELATED APPLICATION

This application claims the benefit of U.S. Provisional Patent Application Ser. No. 62/051,252 filed Sep. 16, 2014 entitled "IN-VIEW AND OUT-OF-VIEW REQUEST-RELATED RESULT REGIONS FOR RESPECTIVE RESULT CATEGORIES", the entirety of which is incorporated herein by reference.

FIELD OF THE INVENTION

The invention relates to systems and methods of providing in-view and out-of-view request-related result regions for respective result categories.

BACKGROUND OF THE INVENTION

Viewing and navigating request-related results may be a cumbersome for a user. For example, if a user wishes to view and navigate request-related results across disparate information sources, the user typically has to obtain request-related results from each information source, and select results of interest from among different the request-related results. The process can become even more cumbersome as the number of information sources from which request-related results are obtained increase. Furthermore, users may prefer to view some results over others, or may trust or otherwise wish to view results from certain information sources over others. These and other drawbacks exist.

SUMMARY OF THE INVENTION

The system may facilitate result presentation by providing, in response to a user request, at least one region that is designated to initially be in-view and at least one region that is designated to initially be out-of-view where: (i) the initial in-view region comprises one or more results related to the user request and a first category; and (ii) the initial out-of-view region comprises one or more results related to the user request and the second category. A result related to a category may comprise a result related to a specific topic, a result of a specific type, a result from a specific source, or other result. A user request may comprise a query, a command, or other user request.

In an implementation, the system may provide a first region and a second region in response to a user request where: (i) the first region is designated to initially be in-view and comprises one or more results related to the user request from a first source (e.g., without results from a second source); and (ii) the second region is designated to initially be out-of-view and comprises one or more results related to the user request from the second source.

In an implementation, at least five regions may be provided in response to a user request where at least one region is designated to initially be in-view and at least another region is designated to initially be out-of-view. A first region (designated to initially be in-view) may comprise local results related to the user request that are obtained from a persistent storage of a user device (at which the results are presented). A second region (designated to initially be out-of-view) may comprise results related to the user request that are obtained from a particular remote service. A third region may comprise YouTube results related to the user request. A fourth region may comprise shopping results related to the user request. A fifth region may comprise Google web search results related to the user request, and so on.

In an implementation, results related to a user request may be obtained for a region that is designated to initially be in-view and for a region that is designated to initially be out-of-view in response to the user request without further input from a user after submission of the user request. As an example, in response to the user request, results for both regions may be obtained and loaded simultaneously in their respective regions. As such, when a user input to switch a region's out-of-view mode to in-view mode is received, the results of the new in-view region (or previous out-of-view region) may be instantaneously displayed to the user.

In an implementation, a region comprising results related to a user request may initially be in-view or out-of-view for a user based on preference information associated with the user, history information indicating one or more actions of the user, the user request (e.g., results in one region is more related to an intent of the user request compared to results in other regions), or other criteria.

In an implementation, priorities may be associated with regions based on preference information associated with the user, history information indicating one or more actions of the user, the user request (e.g., results in one region is more related to an intent of the user request compared to results in other regions), or other criteria. In an implementation, an order of the regions (in which a user is able to access the regions) may be based on the priorities associated with the regions. As an example, a first region having the highest priority may be displayed to the user initially in-view, while other regions are out-of-view. The user may perform a first swipe input to bring a second region having the next highest priority in-view (and to cause the first region to be out-of-view). The user may subsequently perform a second swipe input to bring a third region having the third highest priority in-view (and to cause the second region to be out-of-view), and so on. Of course, as would be appreciated, the user may perform other swipe inputs to return back to other regions (e.g., from a third region back to a second region, etc.).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
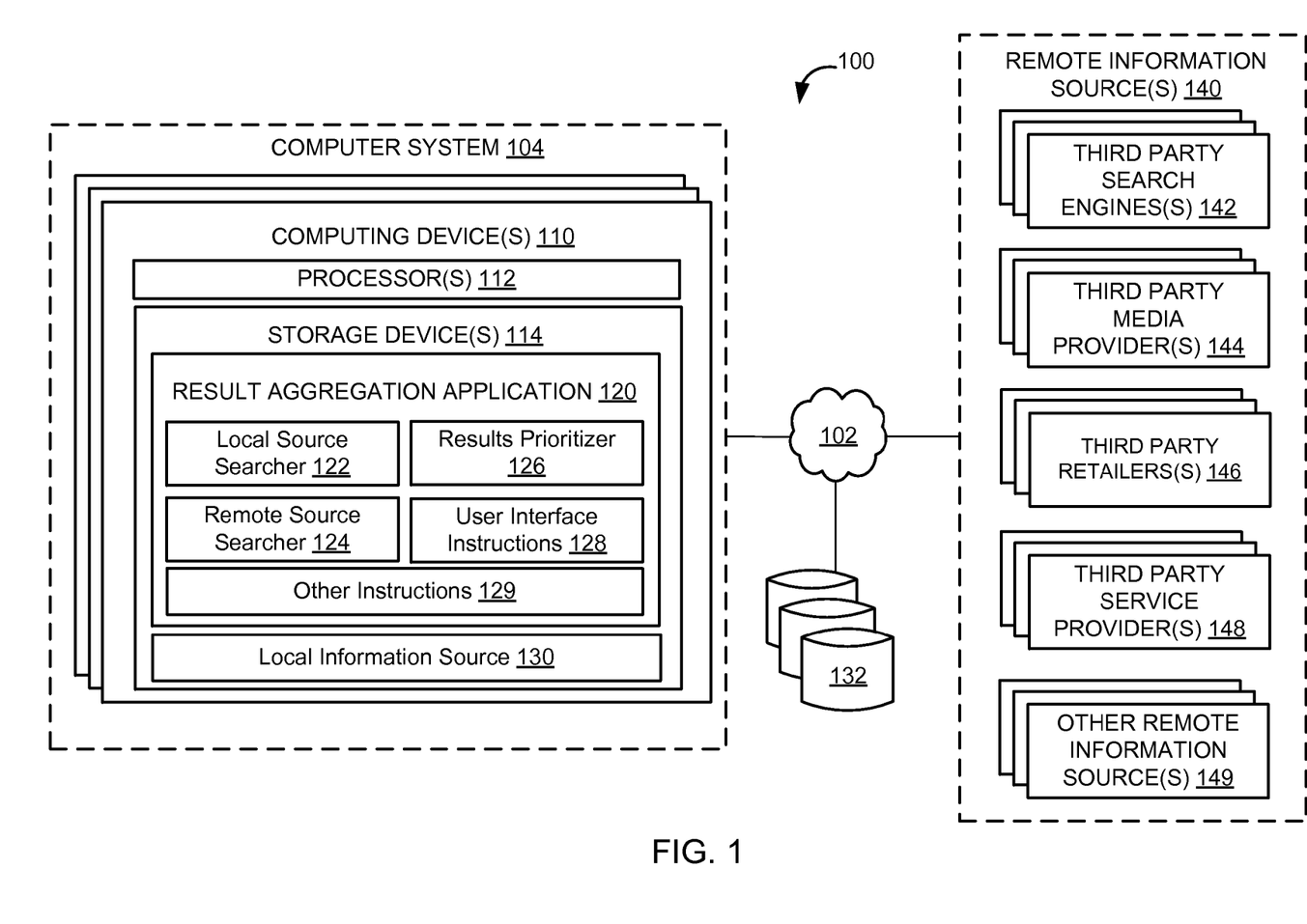
FIG. 1 illustrates a system of providing in-view and out-of-view request-related result regions for respective result categories, according to an implementation of the invention.

FIG. 1 illustrates a system 100 of providing in-view and out-of-view request-related result regions for respective result categories, according to an implementation of the invention. The system may provide an integrated aggregation and display of request-related results.

By way of illustration and not limitation, the request-related results may include search results from different information sources. One or more of the search results may be provided in an in-view region and other ones of the search results in an out-of-view region.

In an implementation, the system may aggregate different sets of results from the different information sources and categorize the aggregated results. For example, the system may aggregate a set of results from a third party search engine with a set of results from a local storage device, and then categorize the aggregated sets of results into different categories. One category of the aggregated sets of results may be initially presented in an in-view (e.g., visible) region of a results interface while other categories may be initially presented in an out-of-view (e.g., not visible—but available) region of the results interface.

In an implementation, the system may not aggregate different sets of results from the different information sources, but instead categorize each set of results separately. For example, the system may categorize a set of results from the third party search engine such that each of the categories includes only results from the third party search engine. The system may likewise separately categorize a set of results from a local storage device.

In this manner, sets of results may be categorized in the aggregate or separately based on the information source from which a given set of results was obtained.

In an implementation, the system may not categorize the sets of results. Instead, a set of search results from one information source may be placed initially in-view while other sets of search results from other information sources may be placed initially out-of-view. In this manner, the results interface may be used to navigate different sets of results from different information sources. Of course, a given set of results may have no content at all. For example, a search result using a search query may return no results. In these instances, even an empty result set (e.g., no results) may be placed initially in-view or initially out-of-view, as described herein.

In an implementation, the system may prioritize the sets of results (and/or categories of results) with respect to one another based on one or more prioritization criteria. The prioritization criteria may include, without limitation, preference information associated with the user, history information indicating one or more actions of the user, the user request (e.g., results in one region is more related to an intent of the user request compared to results in other regions), an explicit user preference, and/or other criteria.

The system may use the prioritization to determine which one or more of the sets of results to initially present in the in-view region. For example, the system may present the highest priority set of results in the in-view region. The system may use the prioritization to determine an order in which to present the sets of results. For example, higher priority sets of results that are out-of-view may be scrolled to be in-view before lower priority sets of results. In this manner, the lowest priority set of results may be navigated to by the user last.

Various examples used herein throughout may refer to examples of search results, although other uses and implementations of the system are contemplated and will be apparent to those having skill in the art using the disclosure herein. Having described a high level overview of some of the system functions, attention will now be turned to various system components that facilitate these and other functions.
System Components System 100 may include a computer system 104, one or more databases 132, one or more remote information sources 140, and/or other components.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The one or more computer program instructions may include, without limitation, result aggregation application 120. Result aggregation application 120 may itself include different sets of instructions that each program the processor(s) 112 (and therefore computer system 104). For example, result aggregation application 120 may include a local searcher 122, a remote searcher 124, a results prioritizer 126, user interface instructions 128, and/or other instructions 129 that program computer system 104. As used herein, for convenience, the various instructions will be described as performing an operation, when, in fact, the various instructions program computer system 104 to perform the operation.
Registering Users and Processing a Request for Information In an implementation, result aggregation application 120 may register a user to use the system. For example, result aggregation application 120 may obtain registration information of a user that includes user settings. The registration information may include, for example, user preference information, an identification of information sources to use, whether and a frequency in which a local information source should be indexed, and/or other user information. The registration information may be stored in one or more databases, such as a database 132.

In an implementation, result aggregation application 120 may receive and process a user request that relates to information to that is sought by a user. The user request may include a request parameter used to obtain search results. For example, the request parameter may include one or more search terms (e.g., keywords, phrases, etc.), images (e.g., image recognition), and/or other parameters used to search for or otherwise obtain information sought by a user. The user request may include, without limitation, a search request, a command (e.g., a structured set of words or phrases), and/or other input. The user request may be received via one or more input formats. For example, an input format may include text, a spoken utterance (in which a spoken word is recognized into text), and/or other input format.

Result aggregation application 120 may process the user request to obtain results related to the user request. For example, result aggregation application 120 may execute a search that returns information related to the result parameter, execute a command that produces output related to the result parameter, or otherwise obtain results related to the result parameter.

In an implementation, result aggregation engine 120 may process the user request using the exact words or phrases from the user request (e.g., using the exact words of the request parameter). For example, result aggregation engine 120 may execute a search or command (or otherwise cause the search or command to be executed) using the exact words of the request parameter as input by the user. In other implementations, result aggregation application 120 may interpret the user request to determine user intent and then execute the search or command (or otherwise cause the search or command to be executed) based on the user intent.

In an implementation, result aggregation application 120 may obtain results related to the user request from different sources of information. The obtained results may include text, image (e.g., videos, photos, etc.), audio, and/or other types of information. The obtained results may be represented in various ways. For example, the obtained results may include actual results (e.g., text, images, etc., resulting from a search or command), links or other references to actual results (e.g., a Universal Resource Locator (URL) link to a website or other information host), and/or other representation of the obtained results. The manner in which the obtained results are represented may be based on the type or source of the information included in the results. For example, results of a search of images on a local storage device may be represented as an actual set of images (or thumbnails of the images), while results of an online search of websites may be represented as set of URL links.

Figure 2A:
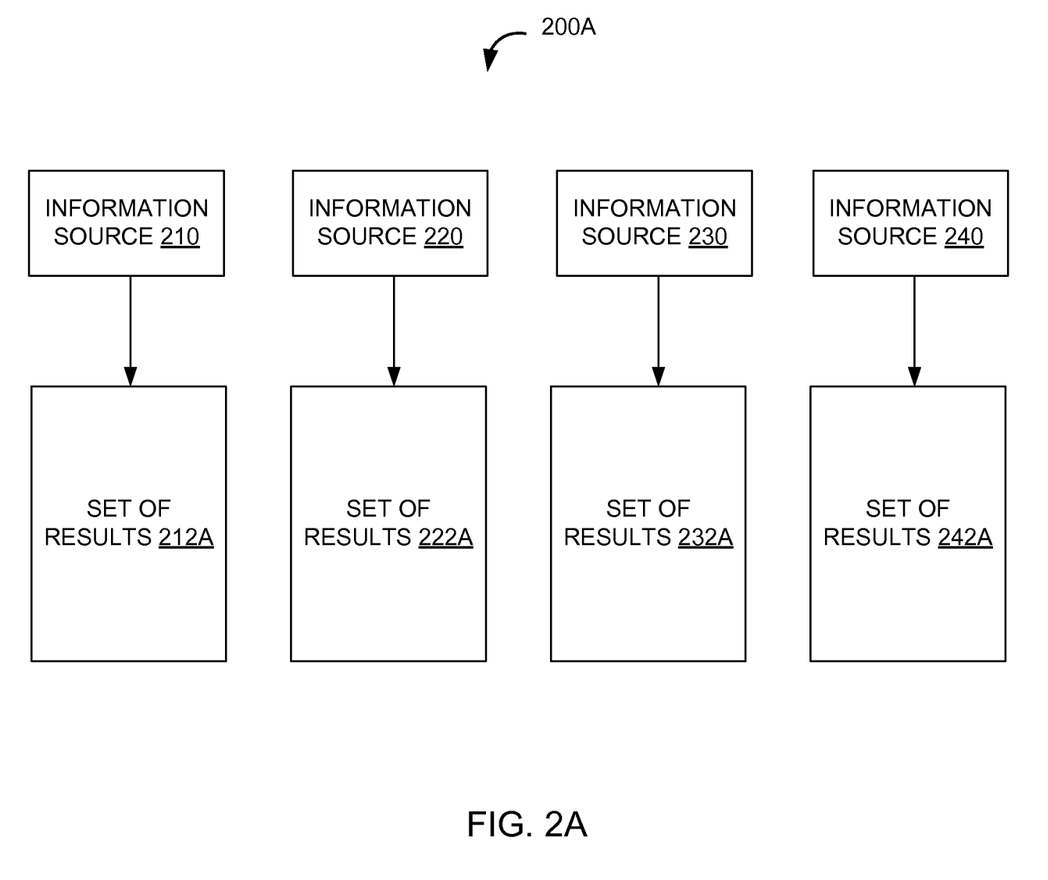
FIG. 2A depicts a block diagram illustrating sets of results each having information only from a single information source, according to an implementation of the invention.

Result aggregation application 120 may obtain results related to the user request from a local source, a remote source and/or other source of information. Each set of results may be individually grouped according to its source. For example, referring to FIG. 2A, which depicts a block diagram 200 illustrating sets of results each having information only from a single information source, a set of results 212A may be obtained from an information source 210. Set of results 212A may include only results available at or otherwise obtained from information source 210. Likewise, sets of results 222A, 232A, and 242A may each be obtained from respective information sources 220, 230, and 240 and may each only respectively include results available at or otherwise obtained from information source 220, 230, and 240. In this manner, the different sets of results 212 may each include only information available at/obtained from a respective information source 210, 220, 230, 240.

In an implementation, result aggregation application 120 may categorize results related to the user request such that a given set of results includes only results related to a given category (which may be irrespective of an information source). For example, referring to FIG. 2B, which depicts a block diagram 200B illustrating sets of results each having information related to a single category but from potentially multiple information sources, the results may be categorized into different sets of results 212B, 222B, 232B, 242B such that each set of results corresponds to a category of results (illustrated as Category 1, 2, 3, and 4).

Figure 2B:
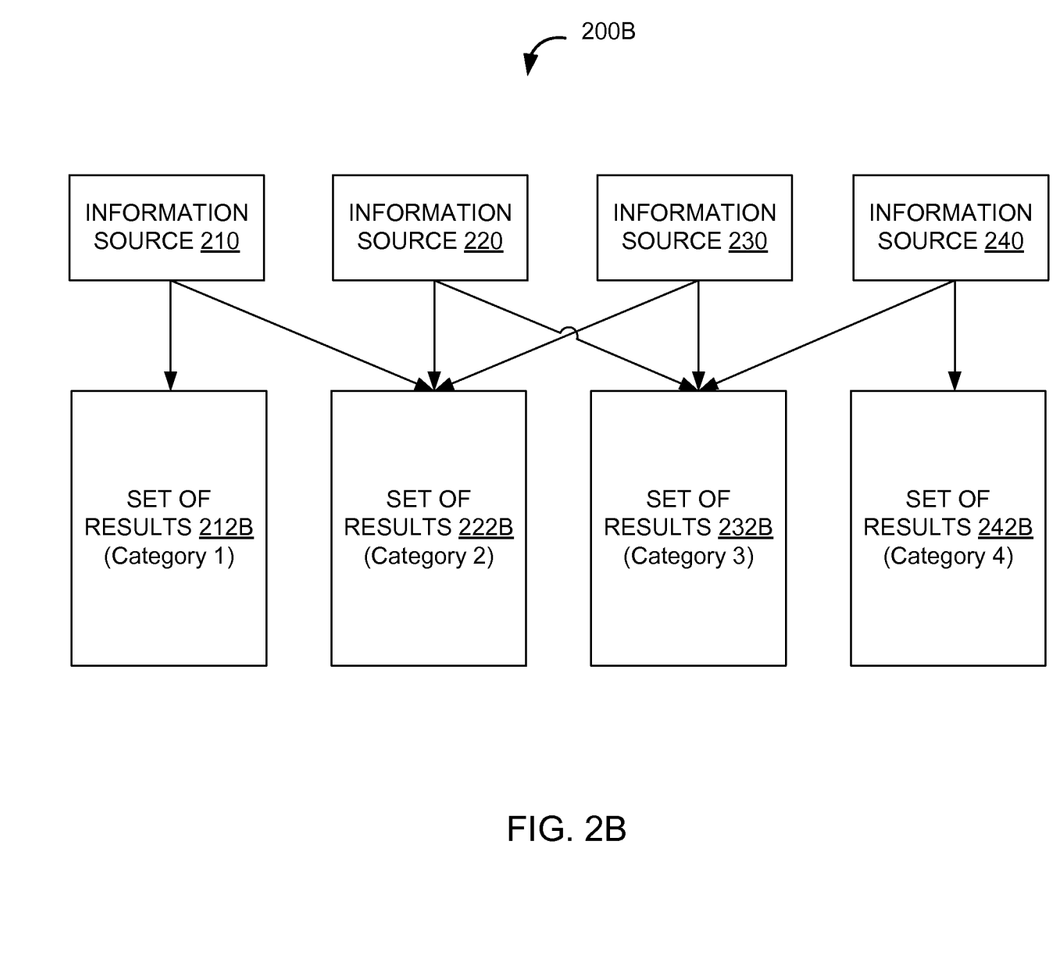
FIG. 2B depicts a block diagram illustrating sets of results each having information related to a single category but from potentially multiple information sources, according to an implementation of the invention.

A given category may include results from two or more information sources 210, 220, 230, 240. For example, an "images" category may include photographs from a user's hard drive and search results from a third party search engine. A category may include results that have at least one trait in common with one another. For example, a category may include a format type (e.g., a category may include photos, another category may include music, yet another category may include videos, and so on), a subject matter (e.g., a category may include content related to sports, another category may include content related to business, and so on), and/or other grouping of information having at least one common trait. Different categories of information may be presented separately and in various ways, as previously described herein.

In an implementation, result aggregation application 120 may categorize information from a given information source such that only information from a given information source is categorized with respect to one another. For example, referring to FIG. 2C, which depicts a block diagram 200C illustrating a set of results having information only from a single information source and categorized into subsets of results, a set of results 212C may be obtained from a single information source 210. The set of results 212C may be categorized into two or more subsets of results (each subset of results illustrated as 250A, 250B, 250N).

Figure 2C:
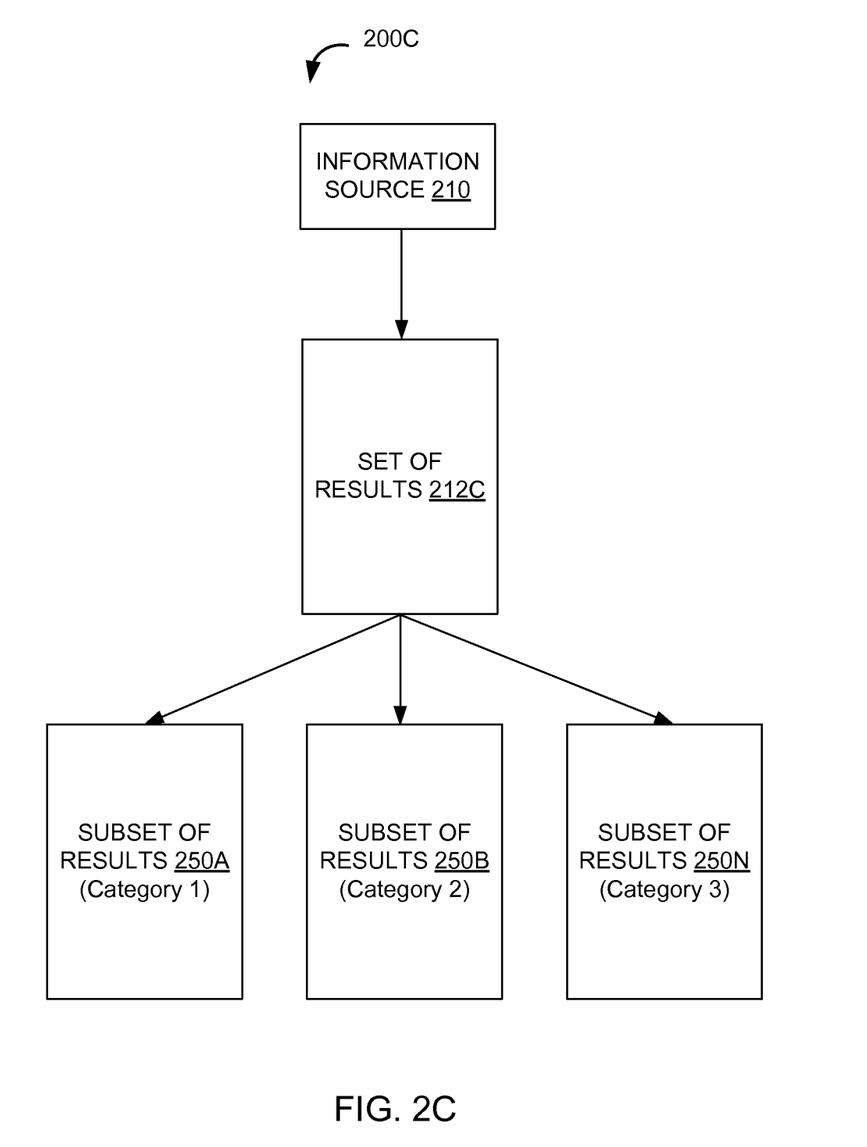
FIG. 2C depicts a block diagram illustrating a set of results having information only from a single information source and categorized into subsets of results, according to an implementation of the invention.

Each subset of results 250 may be associated with its own category of information. For example, results from a search of a user's local hard drive (or other storage device) may be categorized into types of files such that one subset of results includes only photographs and another subset of results includes only documents. Other categories may be used as well. Furthermore, although only a single information source and a single set of results is illustrated, other information sources and associated sets of results may similarly be categories, using the same or different categories as one another.

Referring back to FIG. 1, in an implementation, result aggregation application 120 may prioritize the results from the different sources of information and/or the categories based on one or more prioritization criteria that indicate how the results should be prioritized. The prioritization criteria may include preference information associated with the user, history information indicating one or more actions of the user, information from the user request itself (e.g., results in one region is more related to an intent of the user request compared to results in other regions), and/or other criteria. The prioritization may be used to determine an order in which the sets of results are presented and/or which sets of results should be initially in-view or initially out-of-view.

Having described high level functions and operations of result aggregation application 120, attention will now be turned to particular functions and operations of result aggregation application 120 as illustrated through its various instructions. The various instructions (e.g., local searcher 122, remote searcher 124, results prioritizer 126, user interface application 128, etc.) of result aggregation application 120 are described individually as discreet sets of instructions by way of illustration and not limitation, as two or more of the instructions may be combined.

Indexing, Searching, and Executing Commands Related to Local Storage Sources

In an implementation, local searcher 122 may obtain results related to the user request that are available from a local information source 130, which may be stored at a local storage device (e.g., storage device 114 and/or other local storage device) based on the user request. A local storage device may include a storage device that is accessible to computer system 104 without a remote network connection. For example, the local storage device may include a storage device that is integrated within the same housing as processor(s) 112, removably attached (via a wireless or wired connection) to computer system 104, connected to computer system 104 via a local area network (e.g., inside a firewall), and/or other storage device that is accessible to computer system 104 without a remote network connection. In this manner, local searcher 122 may search a user's local storage device to obtain results related to the user request.

In an implementation, local searcher 122 may index the local storage device (or designated portions) for efficient searching. Such indices may be arranged according to type of file (e.g., photos, videos, documents, etc.), disk partition, solid state blocks, and/or other characteristic. Local searcher 122 may index the local storage device based on user settings obtained during a user registration process, where a user may specify types of files to index, partitions/blocks to index, and/or other parameter that may specify information to index.

Whether or not the local storage device is indexed, local searcher 122 may search the local storage device in response to a user request. For example, the user request may include a search request that includes a result parameter "Hawaii." Local searcher 122 may search the local storage device with files or other information related to "Hawaii." For instance, local searcher 122 may identify a file includes (in its content, title, metadata, etc.) the term "Hawaii." In an implementation, local searcher 122 may categorize the set of results available at the local storage device. For example, local searcher 122 may categorize files related to "Hawaii" into photographs, documents, and/or other types of files.

In an implementation, local searcher 122 may recognize a command that results in a search related to computer system 104 and produces output related to the command. The results of the command may be returned as a set of results related to the local storage device. For example, local searcher 122 may execute a command "show me files related to 'Hawaii,'" which may cause a search of files stored in the local storage device (and/or execute a command that lists directory contents to be executed) that includes metadata related to "Hawaii." In another example, local searcher 122 may execute a command "find the phone number of 'John Doe'." In this example, local searcher 122 may recognize that the command relates to a contact information context and search a contacts folder (which stores user-defined contact information such as phone numbers of others) stored in the local storage device for entries related to the name "John Doe."

Searching Remote Information Sources

In an implementation, remote searcher 124 may obtain results related to the user request that are available from a remote information source 140. Remote information sources 140 may include information sources that are accessible to computer system 104 via a remote or external network connection (e.g., outside of a firewall), such as the Internet. For example, as illustrated in FIG. 1, remote information source(s) 140 may include, without limitation, a third party search engine 142 (e.g., GOOGLE, BING, YAHOO, etc.), a third party media provider 144 (e.g., YOUTUBE, NETFLIX, HULU, etc.), third party retailers 146, including online retailers and offline retailers having an online presence (e.g., AMAZON, GROUPON, EBAY, EXPEDIA, BESTBUY, etc.), third party service providers 148 (e.g., weather services, calendar/scheduling services, etc.), and/or other information source that is remotely accessible to computer system 104.

Continuing the foregoing examples, a user request related to "Hawaii" may cause remote searcher 124 to cause a search on a third party search engine 142 to be initiated using the search term "Hawaii." In an implementation, depending on the context (e.g., indicating that the user intends to plan a trip to Hawaii, remote searcher 124 may add additional search terms such as "tourist destinations" or "things to do." Remote searcher 124 may search (in addition to or instead of) other remote information sources 140 as well (e.g., media related to "Hawaii" from one or more third party media providers 144, retail related to "Hawaii" from one or more third party retailers 146, weather forecasts related to "Hawaii" from one or more third party service providers 148, and/or other information related to "Hawaii" from one or more other remote information sources 149).

In an implementation, remote searcher 124 may categorize each set of results. For example, remote searcher 124 may categorize a given set of GOOGLE search results, categorize media from third party media provider 144, and/or categorize other sets of search results.

Prioritizing Results

In an implementation, results prioritizer 126 may prioritize the set of results based on one or more prioritization criteria. The prioritization may represent a likely interest by the user in the sets of results. For example, a higher-priority set of results may be more likely to be of interest to a user than a lower-priority set of results. The prioritization criteria may include, without limitation, preference information associated with the user, history information indicating one or more actions of the user, the user request (e.g., a given set of results may be more related to an intent of the user request compared to another set of results), and/or other criteria.

In an implementation, results prioritizer 126 may prioritize the set of results based on preference information associated with the user. The preference information may include explicit user input related to prioritizing the set of results. For instance, a given user may provide preference information indicating that a set of results from a local storage device should be initially in-view while other sources of information should be initially out-of-view. Alternatively or additionally, a given user may indicate a ranking of information sources such that the sets of results from those information sources are prioritized accordingly.

In an implementation, results prioritizer 126 may prioritize the set of results based on history information indicating one or more actions of the user. The one or more actions of the user may indicate the relevance of/user interest in a given set of results. The one or more actions may include, without limitation, a historical level of interactivity by the user with sets of results previously presented to the user, a historical browsing history of the user, prior user requests made by the user, and/or other actions of the user.

The historical level of interactivity by the user with sets of results previously presented to the user may indicate a relevance of results from a given information source. For example, if a user tends to interact mostly with results from a given information source, results prioritizer 126 may prioritize future sets of results from the information source higher than other sets of results from other information sources. Results prioritizer 126 may apportion the prioritization according to a level of interactivity with sets of results from different information sources. For instance, the prioritization may be based on a percentage of time that a user has historically interacted with a set of results from each information source such that a higher percentage of time corresponds to a higher prioritization. Alternatively or additionally, the historical level of interactivity may include a number of clicks or retrievals of information in a set of results (which may indicate a degree of relevance).

The historical browsing history of the user may indicate a level of interest in content from a given information source. For example, a greater number of visits by the user to a certain media site may result in higher prioritization from results from that media site over another media site (or other information source) having a lesser number of visits by the user.

In an implementation, results prioritizer 126 may prioritize the set of results based on the user request itself (e.g., a given set of results may be more related to an intent of the user request compared to another set of results). For example and without limitation, results prioritizer 126 may determine that a user request is related to a shopping context. In this example, the user may intend to obtain information related to an item for purchase. As such, results prioritizer 126 may prioritize a set of results from a third party retailer 146 over a third party media provider 144.

Results prioritizer 126 may also prioritize categories within a set of results as well. For instance, results prioritizer 126 may determine that the shopping context further relates to a sporting goods context. In this example, results prioritizer 126 may prioritize results related to sporting goods over a results related to another category of goods.

The prioritization may be used to determine which one or more of the set of results should be presented initially in-view and which one or more of the set of results should be presented initially out-of-view. For example, a higher priority set of results may be presented initially in-view while a lower priority set of results may be presented initially out-of-view.

The prioritization may be used to generate an order of presentation of the set of results. For example, a higher priority set of results that is presented initially out-of-view may be later placed in-view (responsive to user input) before a lower priority set of results that is presented initially out-of-view. In a particular example, the prioritization may be used to determine a scroll order that dictates an order in which out-of-view sets of results are scrolled to be in-view.

In an implementation, results prioritizer 126 may prioritize categories within a set of results using the prioritization criteria. For example, results prioritizer 126 may prioritize photographs over videos.

Presenting the Results Via an in-View and Out-of-View Interface

In an implementation, user interface instructions 128 may generate a result interface that presents the sets of results related to the user request. A result interface may include one or more in-view regions and one or more out-of-view regions. An in-view region may include a display region of the result interface that is visible (e.g., is rendered by a display device). An out-of-view region may include another display region of the result interface that is not visible (e.g., is not rendered for display by the display device). Examples of result interfaces are illustrated with respect to FIGS. 3A, 3B, and 4, which are described below.

In an implementation, any in-view regions and any out-of-view regions may each already include a respective set of results prior to display to the user. In other words, the result interface may include an integrated set of results that include at least one set of results that are initially in-view and at least one set of results that are initially out-of-view. In this manner, the sets of results may be simultaneously provided to a device that displays the results and/or cached at the device that displays the sets of results so that a user may navigate different sets of results without having to execute a search or command to obtain the desired set of results when navigating the result interface.

When different sets of results are navigated, a set of results currently displayed in an in-view region may be exchanged with another set of results currently set as an out-of-view region. In this manner, a user may change content that is displayed by an in-view region. For example, an in-view region may include a first set of results related to a user request that is available in a local storage device. A first out-of-view region may include a second set of results related to the user request from a third party search engine 142. A second out-of-view region may include a third set of results related to the user request available at (e.g., from) a third party media provider 144. Other out-of-view regions may each include a respective set of results from an information source (e.g., a local information source 130 or a remote information source 140). The result interface (and/or user interface instructions 128) may maintain a display state for each set of results (and/or category of results) so that whether a given state of results is currently in-view or out-of-view may be determined. In this manner, the result interface, for example, may display (or not display) appropriate sets of results as the user navigates different regions.

When the result interface receives an indication to change the content of the in-view region, the first set of results may be replaced with the second set of results so that the first set of results is now in an out-of-view region and the second set of results is now in an in-view region. In this manner, a user may scroll through different sets of results based on their source and/or category.

The indication to change the content may include an input. The input may include, without limitation, a gesture on a touchscreen display (e.g., a swipe input in which an object such as a finger is detected to move from one portion of a touch input such as a touchscreen to another portion of the touch input), a gesture detected without contact on a touchscreen display (e.g., an eye or hand movement), a contact with a user interface component (e.g., a button selection), voice, and/or other input. Alternatively or additionally, the indication to change the content may include an automatic input such as a timed scroll and/or other automatic input.

As previously described herein, in an implementation, the sets of results may be prioritized with respect to one another. User interface instruction 128 may generate the result interface based on the prioritization. For example, one or more of the highest priority sets of results may be designated to be initially in-view, while the remaining sets of results may be designated to be out-of-view. Alternatively or additionally, an order in which a given set of results appears when changing the content of an in-view region may be based on the prioritization. For instance, a higher-priority set of results may appear before a lower priority set of results, which may appear before still a lower priority set of results as a user swipes through the sets of results in a first direction. In this manner, the result interface may order higher-priority sets of results to be displayed before lower priority sets of results until the lowest priority set of results is reached. When the lowest priority set of results is reached, a further swipe input (or other input) in the first direction may cause an end of list or may return to the beginning of list (e.g., the highest priority set of results). As would be appreciated, subsequent swipe inputs (or other inputs), such as swipes in the opposite direction, may cause the result interface to return to higher priority sets of results as well (e.g., back to a higher priority set of results from a lower priority set of results).

Examples of System Architectures and Configurations

Different system architectures may be used. For example, all or a portion of result aggregation application 120 may be executed on a user device. In other words, computing device 110 as illustrated may include a user device operated by the user. In implementations where all or a portion of result aggregation application 120 is executed on the user device, the user device may search local information sources (e.g., its own storage device), initiate searches on remote information sources 140, obtain sets of results, generate the results interface, and/or perform other functions/operations of result aggregation application 120.

All or a portion of result aggregation application 120 may be executed on a server device. In other words, computing device 110 as illustrated may include a server device that obtains a user request from a user device operated by the user. In implementations where all or a portion of result aggregation application 120 is executed on the server device, the server device may search local information sources (or cause a search of a local information source), initiate searches on remote information sources 140, obtain sets of results, generate the results interface, provide the results interface to a user device, and/or perform other functions/operations of result aggregation application 120.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3A:
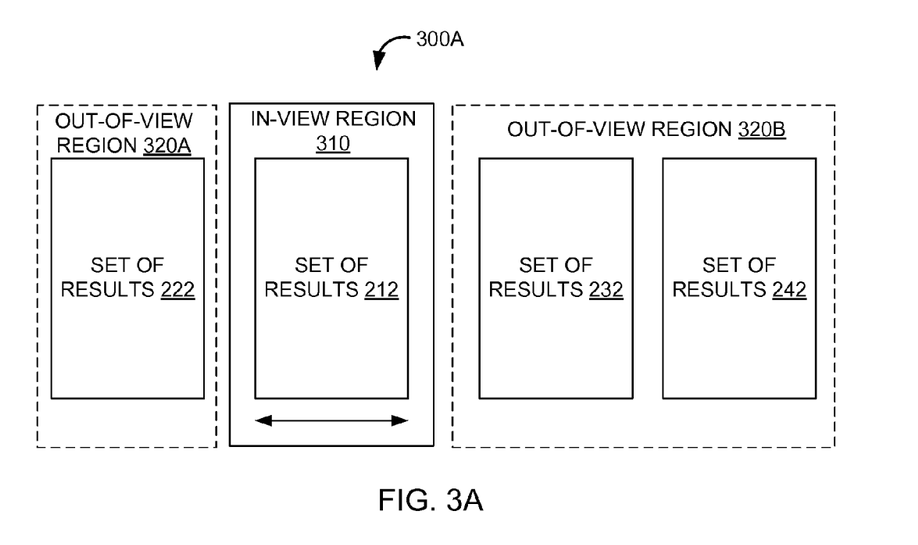
FIG. 3A depicts an example of a result interface for providing in-view and out-of-view regions having results related to a user request, according to an implementation of the invention.
Figure 3B:
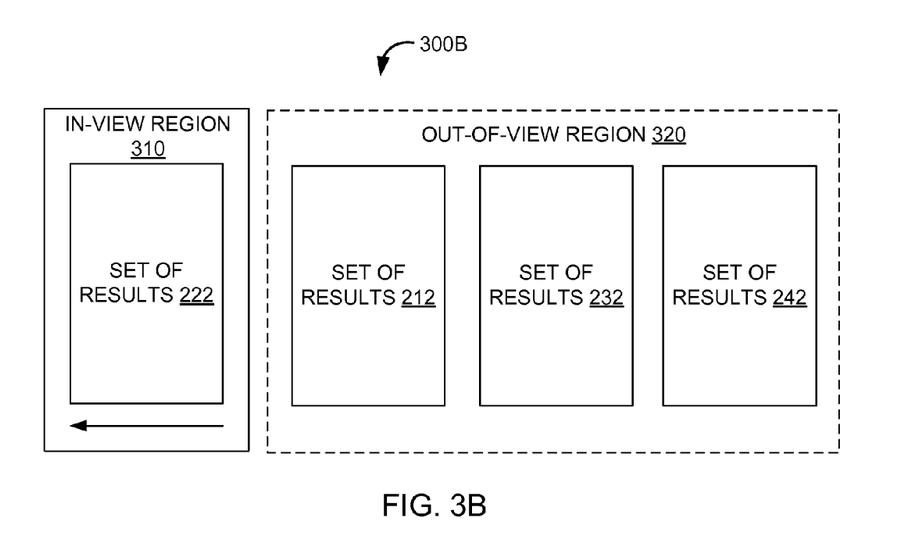
FIG. 3B depicts an example of a result interface for providing in-view and out-of-view regions having results related to a user request after a user input that changes content in an in-view region, according to an implementation of the invention.

FIG. 3A depicts an example of a result interface 300A for providing in-view and out-of-view regions having results related to a user request, according to an implementation of the invention. In-view region 310 may display (e.g., make visible) a set of results 212. The double-headed arrow indicates a direction in which the content of in-view region 310 may be changed based on an input (e.g., a user swipe on a touchscreen display). For instance, the content displayed by in-view region 310 may be changed to display a set of results (222, 232, 242) that is currently in an out-of-view region 320, which may cause the currently viewed set of results (212) to become out-of-view.

In an implementation, as described above, each set of results may correspond to information only available at/obtained from a single information source. As such, a user may, for example, input a user request that includes a result parameter (e.g., a search string) and view results from various information sources (including the user's local storage device, a third party search engine, a third party retail site, etc.) by swiping through the results. For example, referring to FIG. 3B, which depicts an example of a result interface 300B for providing in-view and out-of-view regions having results related to a user request, a swipe in the "right" direction may cause set of results 222 to be displayed in the in-view region 310 and set of results 212 to be moved to an out-of-view region 320.

As used herein, notions of "left," "right," "up," and "down" are arbitrarily used for convenience only and may refer to a direction with respect to and referencing a user viewing a results interface in an upright manner. Referring to both FIGS. 3A and 3B, as illustrated, result interface 300 (300A, 300B) includes a single in-view region 310 that displays a single set of results 212. However, result interface 300 may include more than one in-view region 310 that displays one or more sets of results (and different numbers and configurations of out-of-view regions 320 may be used as well). Alternatively or additionally, in-view region 310 may display more than one set of results as well. Furthermore, instead of or in addition to being configured to be scrolled/swiped in a left-right manner, results interface 300 may be configured to be scrolled/swiped in an up-down, diagonal, or other direction as well.

Figure 4:
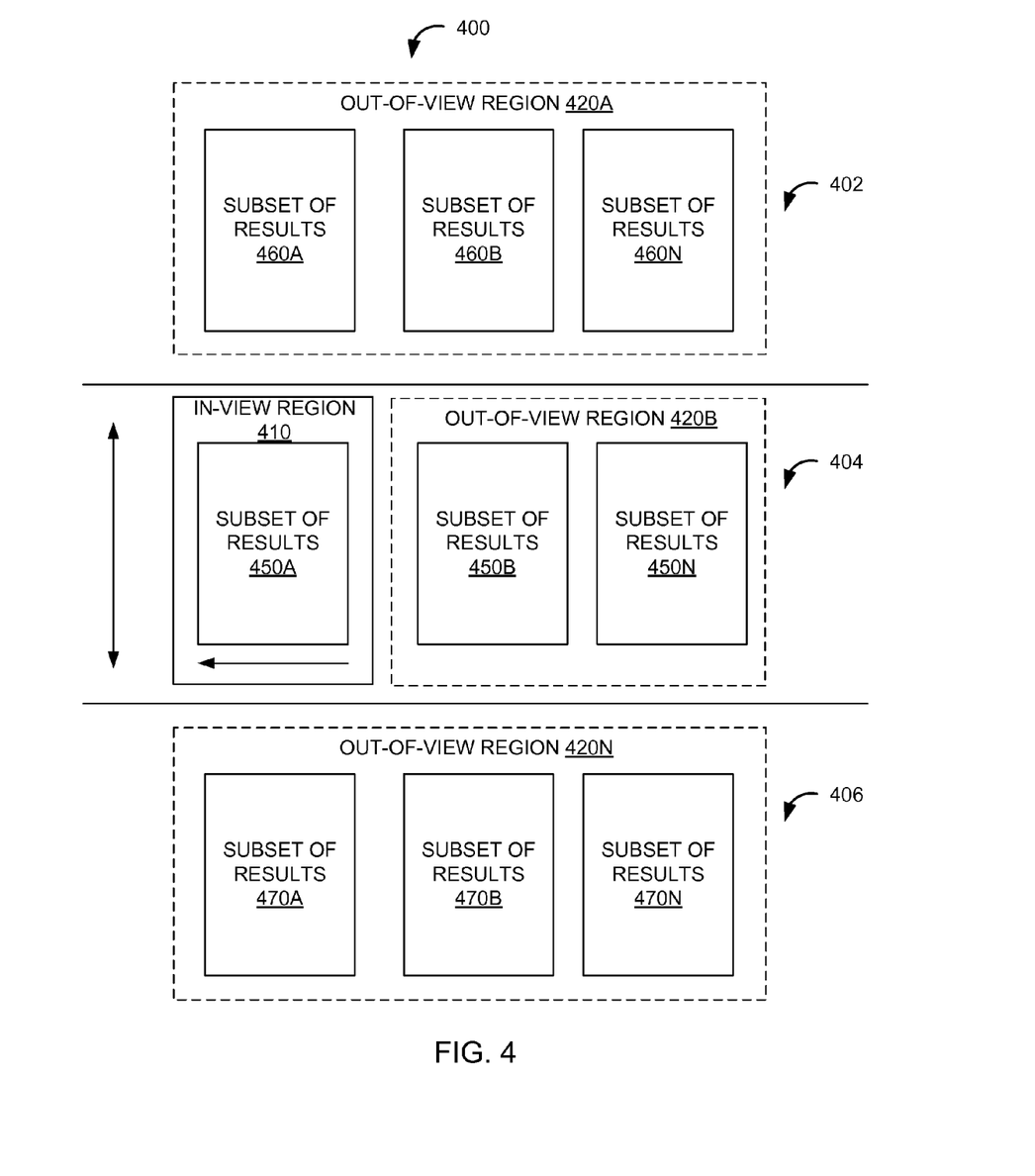
FIG. 4 depicts an example of a result interface for navigating results from information providers and then navigating categories within the results from each information provider, according to an implementation of the invention.

FIG. 4 depicts an example of a result interface 400 for navigating results from information providers and then navigating categories within the results from each information provider, according to an implementation of the invention. Result interface 400 may include a plurality of sections (illustrated in FIG. 4 as sections 402, 404, 406). Each section may initially be configured to include a set of results from an information source that is categorized into different subsets of results. Section 404 may include an in-view region 410 and an out-of-view region 420B. In-view region 410 may initially display a subset of results 450A, which may include a category of results from a single information source. Out-of-view region 420B may initially include (but not be displayed) subset of results 450B and subset of results 450N, which may each include other categories of information from the single information source.

The arrow illustrated within in-view region 410 indicates a direction in which results initially in section 404 may be scrolled to reveal subset of results 450B or subset of results 450N in in-view region 410 (thereby replacing subset of results 450A in in-view region 410). For example and without limitation, subset of results 450A, 450B, 450N may include categories of results from a search of a local information source. A user may search "Hawaii" in order to obtain information related to "Hawaii." Files related to "Hawaii" on the user's hard drive may be categorized into photos, video, and documents. For instance, subset of results 450A may include photos stored on the user's hard drive related to Hawaii, subset of results 450B may include videos stored on the user's hard drive related to Hawaii, and subset of results 450N may include documents stored on the user's hard drive related to Hawaii. Other numbers and types of categories may be used as well, which may be configured by the user according to pre-stored or user settings that are input at the time of a search.

The bi-directional arrow indicates that the contents of section 402 or 406 may be placed in section 404 based on a user input (e.g., a swipe input). For example, the set of results initially at section 402 may be scrolled to view at least one subset of the results in in-view region 410. The set of results initially at section 406 may similarly navigated. Similar to the subset of results 450, subset of results 460A, 460B, and 460N may include categories of information from a single information source (different from the information source associated with subset of results 450.

Continuing the foregoing example, information related to "Hawaii" may be searched using a third party search engine. The results may be categorized according to the same or different categories of information as those for subset of results 450. For example, photos, videos, and documents related to "Hawaii" returned from the third party search engine may be separately categorized into subset of results 460A, 460B, and 460N. Subset of results 470 may likewise be categorized using information from yet another information source (e.g., a third party media provider). In this manner, the user may provide a user request, for which different sets of results from different information providers related to the user request may be obtained. Each set of results may be categorized in the same or different manner as one another.

When the same categories are used to group subsets of information from different information providers, results interface 400 may maintain a category state that indicates which category is currently in-view. For example, if a user is viewing photograph results from a local hard drive related to "Hawaii" and then scrolls "up" to results from a third party search engine, photos from the third party search engine may be placed in in-view region 410. If the user scrolls "right" to view a different category (e.g., a different subset of results 460) such as video, then upon scrolling down back to local search results, videos from the user's hard drive may be displayed in the in-view region 410. In this manner, the user may efficiently navigate results from different information providers and different categories of information in a seamless manner.

Figure 5:
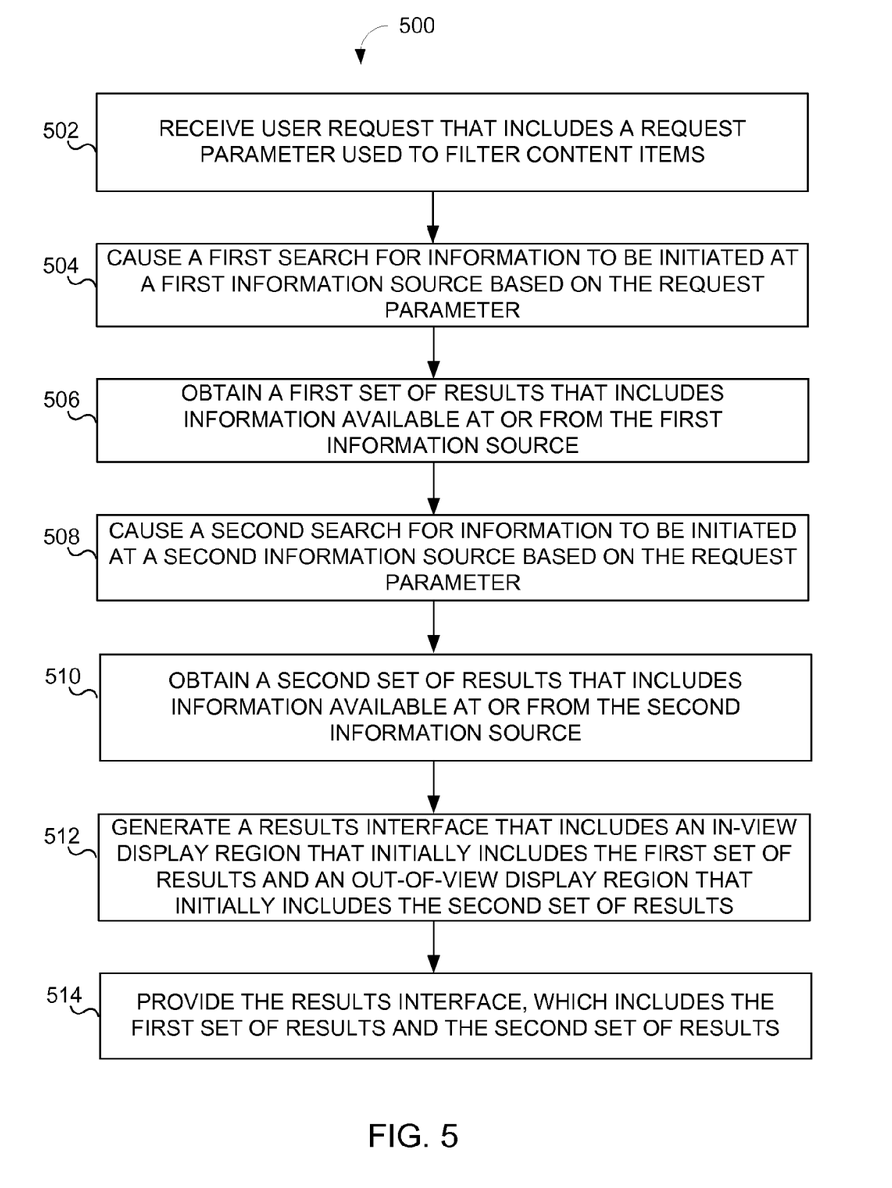
FIG. 5 depicts a process diagram for a process of providing in-view and out-of-view request-related result regions for respective result categories, according to an implementation of the invention.

FIG. 5 depicts a process flow diagram 500 for a process of providing in-view and out-of-view request-related result regions for respective result categories, according to an implementation of the invention. The various processing operations and/or data flows depicted in FIG. X (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a user request that includes a request parameter used to filter in or out one or more content items from a first information source and a second information source may be received. For example and without limitation, the request parameter may include a search term (e.g., one or more keywords) that is used to identify content at the first information source that includes (or is otherwise relevant to) the search term and identify content at the second information source that includes (or is otherwise relevant to) the search term.

In an operation 504, a first search for information using the request parameter may be initiated at the first information source. For example, a local information source (e.g., a local hard drive) may be searched (or caused to be searched) for content that is relevant to the request parameter. In an implementation, instead of or in addition to searching a local information source, an index that includes a pre-searched set of contents of the local information source may be used as well (or instead of searching the local information source).

In an operation 506, an identification of at least a first set of results available at or obtained from the first information source based on the initiated search may be obtained. For example, local content that is relevant to the request parameter and is available at a local information source may be obtained from an index of the local information source and/or from the local information source itself.

In an operation 508, a second search for information using the request parameter may be initiated at a second information source. The second search may be initiated prior to presentation of the first set of results. In this manner, the results of the first search and the second search, for example, may be simultaneously presented for display to the user (although one set of results may be initially out-of-view). For example, a remote information source (e.g., a third party search engine) may be searched (or caused to be searched) for content that is relevant to the request parameter.

In an operation 510, an identification of at least a second set of results available at the second information source based on the initiated second search may be obtained. For example, a third party search engine may return (and operation 510 may receive) a set of results that is relevant to the request parameter.

In an implementation, other information sources (e.g., other than the first information source and the second information source) may be searched as well. The number of information sources to search may be preconfigured or otherwise based on available information sources to search.

In an operation 512, a results interface that includes an in-view display region that initially includes the first set of results and an out-of-view display region that initially includes the second set of results may be generated. In this manner, one of the results of the first search or the second search may be presented initially in-view while the other is presented initially out-of-view.

In an operation 514, the results interface to be displayed, wherein the in-view display region is visible at a given time and the out-of-view display region is not visible at the given time may be provided for display to the user. In implementations where process 500 is executed on a local (e.g., user) device, the results interface may be generated by a processor of the local device and displayed via a display of the local device. In implementations where process 500 is executed on a remote (e.g., server) device, the results interface may be generated by the remote device and communicated to a local (e.g., user) device, which displays the results interface via a display of the local device.

Figure 6:
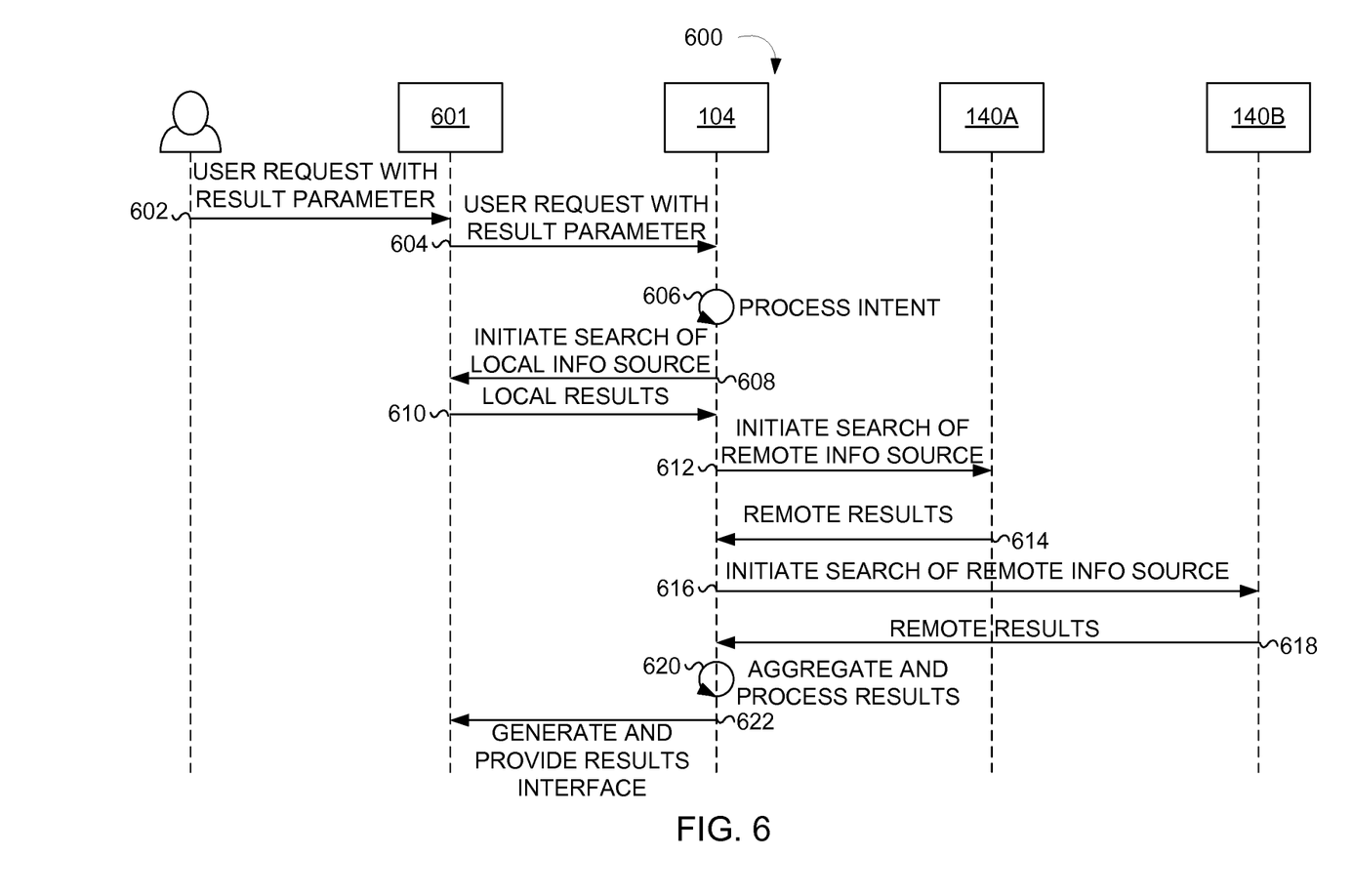
FIG. 6 depicts a data flow diagram for a process of providing in-view and out-of-view request-related result regions for respective result categories, according to an implementation of the invention.

FIG. 6 depicts a data flow diagram for a process 600 of providing in-view and out-of-view request-related result regions for respective result categories, according to an implementation of the invention. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a user device 601 may receive a user request that includes a result parameter. For instance, a user may type a search term, speak a verbal utterance, or otherwise input the user request and/or the result parameter using user device 601. User device 601 may include a computing device programmed with one or more physical processors.

In an operation 604, user device 601 may provide (and computer system 104 may receive) the user request. In some implementations, one or more of the functions/operations of computer system 104 may be performed by user device 601 and vice versa. In other words, different system architectures may be used as described herein.

In an operation 606, in some implementations, computer system 104 may process the user request and/or the request parameter. In these implementations, computer system 104 may determine an intent of the user and regenerate a new user request or otherwise modify the user request based on the determined intent. For example, and without limitation, computer system 104 may receive an initial user request of "tell me the weather in Seattle" and reformulate a user request that obtains weather-related information for Seattle, without searching or querying information sources using the express language "tell me the weather in Seattle."

In an operation 608, computer system 104 may initiate a search of a local information source based on the user request. For example, computer system 104 may search a local storage device of user device 601 (or an index of the local storage device of user device 601). Alternatively or additionally, user device 601 may perform the search of its local storage device as well and obtain results of the search as well.

In an operation 610, computer system 104 may obtain a first set of results available at the local information source.

In an operation 612, computer system 104 may initiate a search of a first remote information source 140A based on the user request. For example, computer system 104 may cause a third party search engine to execute a search using the request parameter.

In an operation 614, the first remote information source 140A may provide (and computer system 104 may receive) a second set of results. The second set of results may include search results from the first remote information source.

In an operation 616, computer system 104 may initiate a search of a second remote information source 140B based on the user request. For example, computer system 104 may cause a third party media provider to search for available media using the request parameter.

In an operation 618, the second remote information source 140B may provide (and computer system 104 may receive) a third set of results. The third set of results may include search results from the second remote information source. Other numbers of remote information sources may be searched as well.

In an operation 620, computer system 104 may aggregate and process the first set of results, the second set of result, the third set of results, and/or other sets of results. The processing may include categorizing the results (either cumulatively or within respective sets of results), prioritizing the results, and/or performing other processing operations to display the sets of results.

In an operation 622, computer system 104 may generate a results interface that includes an in-view region and an out-of-view region. At least one of the first set of results, the second set of result, the third set of results, and/or other sets of results is initially visible through the in-view region, while other sets of results are initially not visible in the out-of-view region. Because the results interface includes the aggregated results, a user may make visible the different sets of results without performing searches or other actions based on the user request while navigating the results interface.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method for providing in-view and out-of-view request-related result regions for respective results, the method being implemented on a computer system having one or more physical processors programmed with computer program instructions to perform the method, the method comprising:

receiving, by the computer system, a user request comprising a request parameter used to filter in or out one or more content items from a first information source and a second information source;

sending, by the computer system, the request parameter to the first information source to cause initiation of a first search for information;

obtaining, by the computer system, an identification of at least a first set of results from the first information source based on the initiated search;

sending, by the computer system, the request parameter to the second information source to cause initiation of a second search for information, wherein the second search is caused to be initiated prior to presentation of the first set of results;

obtaining, by the computer system, an identification of at least a second set of results from the second information source based on the initiated second search;

obtaining, by the computer system, stored prioritization criteria that indicates a ranking of the first information source with respect to the second information source, the ranking dictating whether results from the first information source or results from the second information source should be initially placed in the in-view region;

determining whether the first set of results obtained from the first search for information at the first information source or the second set of results obtained from the second search for information at the second information source should be placed in an in-view display region based on stored prioritization criteria and determining that that the other of the first set of results and second set of results should be placed in an out-of-view display region based on the stored prioritization criteria;

generating, by the computer system, a results interface that includes the in-view display region that initially includes the determined one of the first set of results obtained from the first search for information at the first information source and the second set of results obtained from the second search for information at the second information source and the out-of-view display region that initially includes the other of the first set of results and second set of results; and providing, by the computer system, the results interface to be displayed, wherein the in-view display region is visible at a given time and the out-of-view display region is not visible at the given time.

2. The method of claim 1, the method further comprising:
receiving a user indication to switch content of the in-view display region; and
causing the first set of results to be taken out of the in-view display region and the second set of results to be move into the in-view display region responsive to the user indication.

3. The method of claim 2, wherein the user indication comprises a swipe input detected via a touch screen display of the computer system.

4. The method of claim 1, wherein the first set of results is associated with a first category of information and the second set of results is associated with a second category of information.

5. The method of claim 1, wherein causing the first search to be initiated comprises inputting the request parameter to a third party search engine, and wherein the first set of results comprises search results from the third party search engine.

6. The method of claim 1, wherein causing the first search to be initiated comprises searching a local storage device of the computer system.

7. The method of claim 1,
wherein causing the first search to be initiated comprises:
determining a context of the user request;
determining an intent of the user request based on the context; and
modifying the request parameter based on the determined intent.

8. The method of claim 7, wherein determining an intent of the user comprises performing natural language processing on the search input.

9. The method of claim 1, wherein the stored prioritization criteria includes an in-view user preference display parameter.

10. The method of claim 1, the method further comprising:
causing, by the computer system, a third search for information to be initiated at a third information source using the request parameter, wherein the third search is caused to be initiated prior to presentation of the first set of results;
obtaining, by the computer system, an identification of at least a third set of results from the third information source based on the initiated third search;
determining a first priority for the first set of results based on the stored prioritization criteria;
determining a second priority for the second set of results based on the stored prioritization criteria;
determining a third priority for the third set of results based on the stored prioritization criteria; and
ordering the in-view display region containing the first set of results, the out-of-view display region containing the second set of results, and a second out-of-view display region containing the third set of results with respect to each other based on the first priority, the second priority, and the third priority.

11. The method of claim 10, wherein the stored prioritization criteria comprises preference information associated with the user, history information indicating one or more prior actions of the user, the user request, or one or more prior user requests.

12. The method of claim 1, the method further comprising:
aggregating the first set of results and the second set of results; and
determining one or more categories of results based on the aggregated first and second set of results.

13. The method of claim 1, the method further comprising:
determining one or more first categories of the first set of results; and
determining one or more second categories of the second set of results, wherein the one or more first categories are the same as or different from the one or more second categories.

14. A system of providing in-view and out-of-view request-related result regions for respective results, the system comprising:
    a computer system having one or more physical processors programmed with computer program instructions to:
    receive a user request comprising a request parameter used to filter in or out one or more content items from a first information source and a second information source;
    send the request parameter to the first information source to cause a first search for information to be initiated;
    obtain an identification of at least a first set of results from the first information source based on the initiated search;
    send the request parameter to the second information source to cause a second search for information to be initiated, wherein the second search is caused to be initiated prior to presentation of the first set of results;
    obtain an identification of at least a second set of results from the second information source based on the initiated second search;
    determine whether the first set of results obtained from the first search for information at the first information source or the second set of results obtained from the second search for information at the second information source should be placed in an in-view display region based on stored prioritization criteria and determining that the other of the first set of results and second set of results should be placed in an out-of-view display region based on the stored prioritization criteria;
    generate a results interface that includes the in-view display region that initially includes the determined one of the first set of results obtained from the first search for information at the first information source and the second set of results obtained from the second search for information at the second information source and the out-of-view display region that initially includes the the other of the first set of results and second set of results; and
    provide the results interface to be displayed, wherein the in-view display region is visible at a given time and the out-of-view display region is not visible at the given time.

15. The system of claim 14, wherein the computer system is further programmed to:
    receive a user indication to switch content of the in-view display region; and
    cause the first set of results to be taken out of the in-view display region and the second set of results to be move into the in-view display region responsive to the user indication.

16. The system of claim 15, wherein the user indication comprises a swipe input detected via a touch screen display of the computer system.

17. The system of claim 14, wherein the first set of results is associated with a first category of information and the second set of results is associated with a second category of information.

18. The system of claim 14, wherein to cause the first search to be initiated, the computer system is further programmed to:
    input the request parameter to a third party search engine, and wherein the first set of results comprises search results from the third party search engine.

19. The system of claim 14, wherein to cause the first search to be initiated, the computer system is further programmed to:
    search a local storage device of the computer system.

20. The system of claim 14, wherein the computer system is further programmed to:
    determine a context of the user request and an intent of the user based on the user request; and
    modify the request parameter based on the context of the user request and the intent of the user.

21. The system of claim 20, wherein to determine an intent of the user, the computer system is further programmed to:
    perform natural language processing on the search input.

22. The system of claim 14, wherein the stored prioritization criteria includes an in-view user preference display parameter.

23. The system of claim 14, wherein the computer system is further programmed to:
    cause a third search for information to be initiated at a third information source using the modified request parameter, wherein the third search is caused to be initiated prior to presentation of the first set of results;
    obtain an identification of at least a third set of results from the third information source based on the initiated third search;
    determine a first priority for the first set of results based on the stored prioritization criteria;
    determine a second priority for the second set of results based on the stored prioritization criteria;
    determine a third priority for the third set of results based on the stored prioritization criteria; and
    order the in-view display region containing the first set of results, the out-of-view display region containing the second set of results, and a second out-of-view display region containing the third set of results with respect to each other based on the first priority, the second priority, and the third priority.

24. The system of claim 23, wherein the stored prioritization criteria comprises preference information associated with the user, history information indicating one or more prior actions of the user, the user request, or one or more prior user requests.

25. The system of claim 14, wherein the computer system is further programmed to:
    aggregate the first set of results and the second set of results; and
    determine one or more categories of results based on the aggregated first and second set of results.

26. The system of claim 14, wherein the computer system is further programmed to:
    determine one or more first categories of the first set of results; and
    determine one or more second categories of the second set of results, wherein the one or more first categories are the same as or different from the one or more second categories.

27. The method of claim 7, wherein the request parameter includes at least one search term, and modifying the request parameter comprises regenerating a new user request including at least one alternate search term based on the determined intent.

28. The method of claim 7, wherein modifying the request parameter includes reformulating the language of the user request.

* * * * *